US005917506A

United States Patent [19]

Hsu

[11] Patent Number: 5,917,506

[45] Date of Patent: Jun. 29, 1999

[54] FAST DATA ALIGNMENT DISPLAY QUEUE STRUCTURE FOR IMAGE BLOCK TRANSFER

[75] Inventor: Ching-hao Hsu, Hsinchu, Taiwan

[73] Assignee: Winbond Electronics Corp., Taiwan

[21] Appl. No.: 08/760,520

[22] Filed: Dec. 5, 1996

[51] Int. Cl.[6] .......... G06F 13/00

[52] U.S. Cl. .......... 345/525; 345/513; 345/515; 711/201

[58] Field of Search .......... 345/501, 507–509, 345/513, 523–525, 514, 197, 515, 516; 711/201; 364/715.08

[56] References Cited

U.S. PATENT DOCUMENTS

| | | | |
|---|---|---|---|
| 4,644,569 | 2/1987 | Brown et al. | 375/371 |
| 5,095,422 | 3/1992 | Horiguchi | 711/201 |
| 5,287,452 | 2/1994 | Newman | 711/201 |
| 5,493,646 | 2/1996 | Guttag et al. | 345/525 |

*Primary Examiner*—Kee M. Tung

*Attorney, Agent, or Firm*—Hedman, Gibson & Costigan, P.C.

[57] ABSTRACT

A fast data alignment display queue structure for image block transfer comprises a shift circuit, a bit mask, a multi-layer FIFO buffer and a plurality of multiplexers, wherein input data are shifted a desired number of bytes by the shift circuit, and written to the FIFO buffer, and then the data in each level of the FIFO buffer are read by an external DRAM. By using the structure above, a block can be shifted to right or left by filling the data to the FIFO buffer in the sequence started from the first level or in the sequence started from the last level. Therefore, shifting operation for a block can be implemented in different directions without additional transfer logic.

20 Claims, 7 Drawing Sheets

FAST DATA ALIGNMENT DISPLAY QUEUE STRUCTURE FOR IMAGE BLOCK TRANSFER

BACKGROUND OF THE INVENTION

1. Field of the Invention

The present invention relates to a fast data alignment queue structure for image block transfer, more particularly, to a specific structure of a display queue used in an image display window accelerator, whereby the structure provided by the present invention can simplify operating steps for “block transfer” of an image display card.

2. Description of Related Art

Nowadays, a window environment has become an essential software used in a computer system and so to accelerate the speed of image displaying has become an important issue. A usual manner to increase the speed of image displaying is to use a window accelerator. As a result, window commends can be directly transferred and provided by a built-in hardware in a display card without being transferred by a CPU (central processing unit), and therefore reducing a load for the CPU to thereby improve the display efficiency. The most important basic function of the window accelerator is without doubt BitBLT (bit block transfer). However, it is a very complicated and complex operation to align various transferred data after the block transfer has been processed. Accordingly, there exists a need for a method to simplify the data alignment.

Firstly, the principles and characteristics of block transfer will be explained as follows.

Referring to FIG. 1(*a*), if a block with a start address of (x1, y1) is to be transferred toward a lower-right direction to a such a position that the start address becomes (x2, y2), the block must be transferred by beginning with a point at the lower-right corner thereof. On the other hand, if a block with a start address of (x1', y1') is to be transferred toward an upper-left direction to such a position that the start address thereof becomes (x2', y2'), as shown in FIG. 1(*b*), then the block must be transferred by beginning with a point at the upper-left corner. An image block must be transferred by the manner described above to prevent the data thereof from being damaged.

Accordingly, the window accelerator must execute the operations of data reading, shifting, and writing sequentially as an example shown in FIG. 2. Since the capacitance of a DRAM of the window accelerator is typically 64 bits, this is the unit for data transfer operation. In FIG. 2, each cell indicates a byte, that is, 8 bits. The number in each cell is the address thereof. As shown in this figure, data are read by 64 bits and shifted toward right by two bytes (16 bits), and then the writing operation is sequentially executed by taking 64 bits as a unit. An FIFO buffer can be added therein to make it possible to read several sets of data in a memory cycle and then write them out at a time, so that a timing of the DRAM can accomplish a page mode operation. However, a conventional FIFO buffer, which comprises a plurality of levels, consists of a memory and a read-write controller, wherein a read or write operation can only be executed by a singlelevel at a time, and the executing direction can not be changed, that is, reverse reading or writing is not possible.

Eight possible shift conditions are shown in FIGS. 3(*a*) to (*h*), respectively. As shown in the figures, a set of 8 bytes of data stored with 8 addresses as address 0 to 7 may be transferred to address 0 to 7, 1 to 8, 2 to 9, 3 to 10, 4 to 11, 5 to 12, 6 to 13, or 7 to 14. A precise alignment of the data must be implemented through complex logic operation or transformation. The description above is only adaptable to a right-shift operation. It needs more complex data transfer to execute a left-shift operation since the read-write direction of the FIFO buffer is limited. Therefore, there exists a need for a simplified queue structure to reduce the complexity of the block transfer, and in the mean-while attain the effect for precise alignment.

SUMMARY OF THE INVENTION

One object of the present invention is to provide a fast data alignment display queue structure for image block transfer, which is adaptable for data shifting in different directions without an additional transfer logic operation.

Another object of the present invention is to provide a fast data alignment display queue, which can attain the effect for fast alignment of shifted data by simply filling data into the FIFO buffer and combining the data.

Still another object of the present invention is to provide a fast data alignment display queue to accelerate the reading speed of data by skipping the upper or bottom FIFO level of the DRAM if the level is empty.

In accordance with one aspect of the present invention, the fast data alignment display queue structure for image block transfer comprises a shift circuit, a bit mask, a multi-layer FIFO buffer and a plurality of multiplexers; wherein input data are shifted a desired number of bytes by the shift circuit, and written to the FIFO buffer, and then the data in each level of the FIFO buffer are read by an external DRAM. By using the structure above, a block can be shifted to the right or left by filling the data to the FIFO buffer in the sequence started from the first level or in the sequence started from the last level. Therefore, the shifting operation for a block can be implemented in different directions without additional transfer logic.

In accordance with another aspect of the present invention, the fast data alignment display queue structure for image block transfer can transfer the data in the last level of the FIFO buffer to the first level thereof to combine the data in the last level to the shifted data which will be subsequentially sent to the first level to form a complete set of data through the multiplexers if the data in the last level can not be a complete set because of shifting, and vice versa.

In accordance with a further aspect of the present invention, the first level and the last level of the FIFO buffer of the fast data alignment display queue structure for image block transfer are provided with flags to respectively indicate the validities of the bytes. Therefore, it can be indicated by checking the flags if the first level or the last level is empty, and then the DRAM can skip the empty level to read the data of the next level, such as the second level or the last second level, whereby increasing the speed of the read operation.

Other objects, advantages and novel features of the invention will become more apparent from the following detailed description when taken in conjunction with the accompanying drawings.

DETAILED DESCRIPTION OF PREFERRED EMBODIMENT

Figure 1:
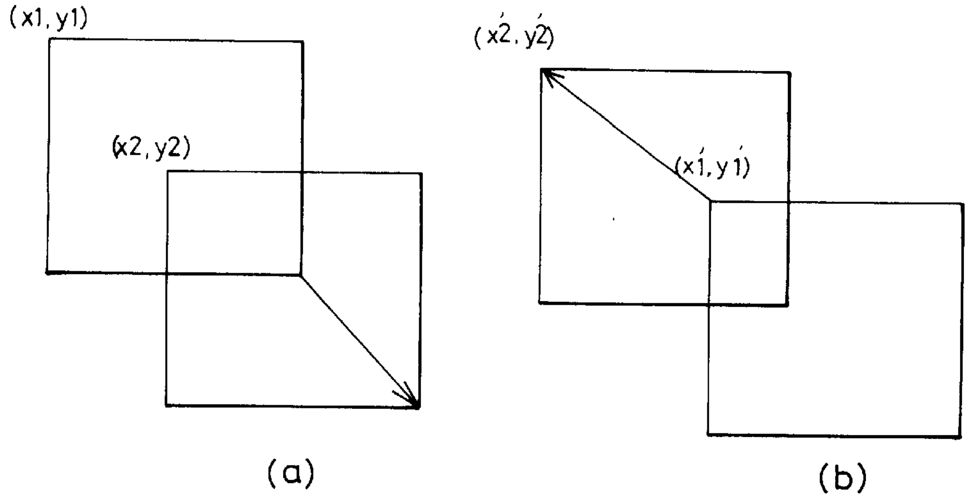
FIG. 1 PRIOR ART
FIGS. 1(*a*) and (*b*) show two example of block transfer, respectively.
Figure 2:
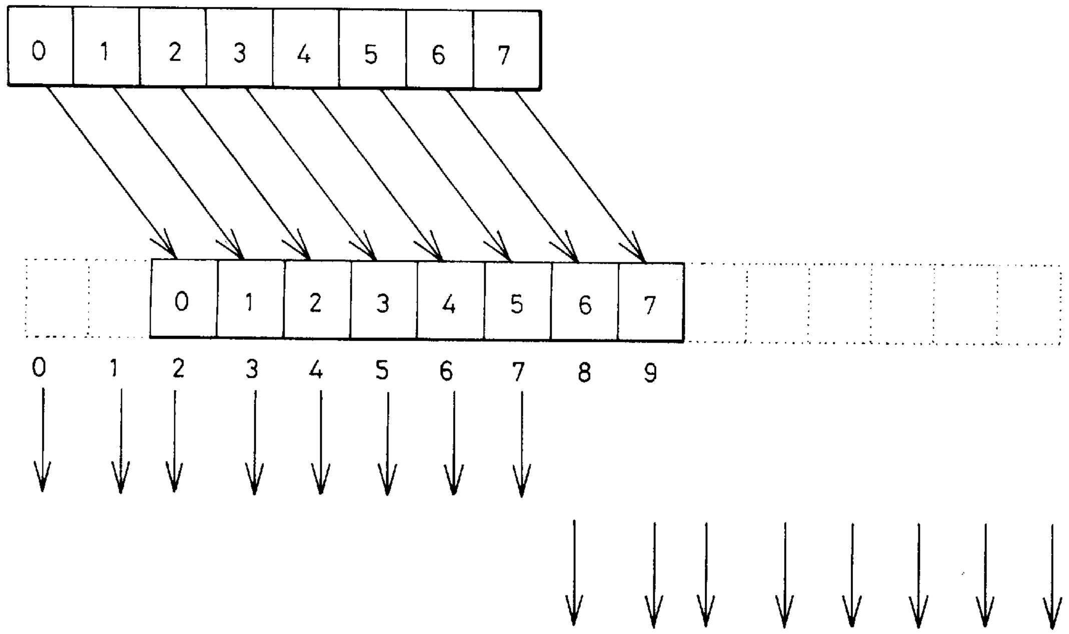
FIG. 2 PRIOR ART
FIG. 2 is a diagram showing the data reading, shifting, and writing.
Figure 3:
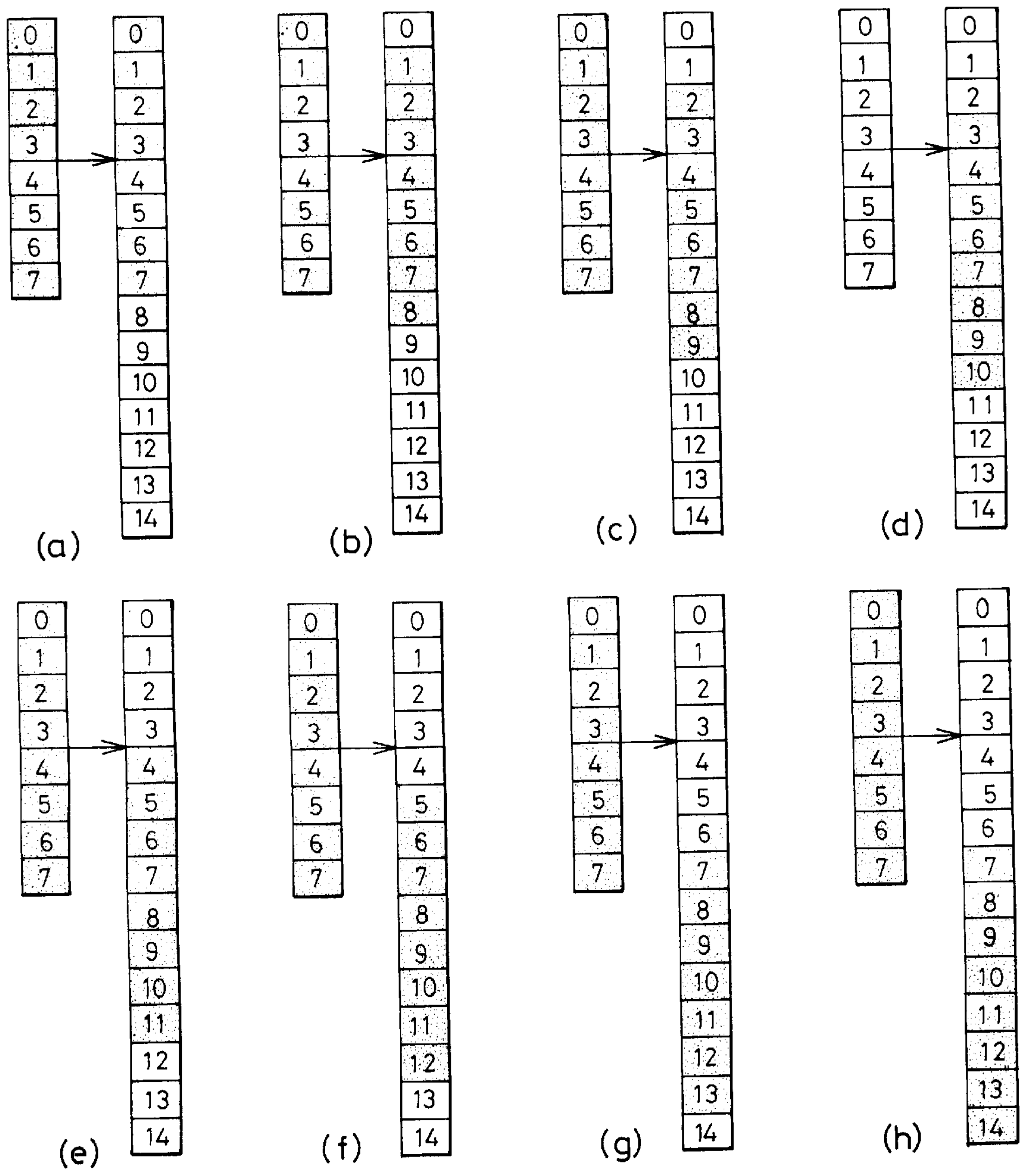
FIG.3 PRIOR ART
FIGS. 3(*a*) to (*h*) show the possible condition for transferring data of 64 bits, respectively.
Figure 4:
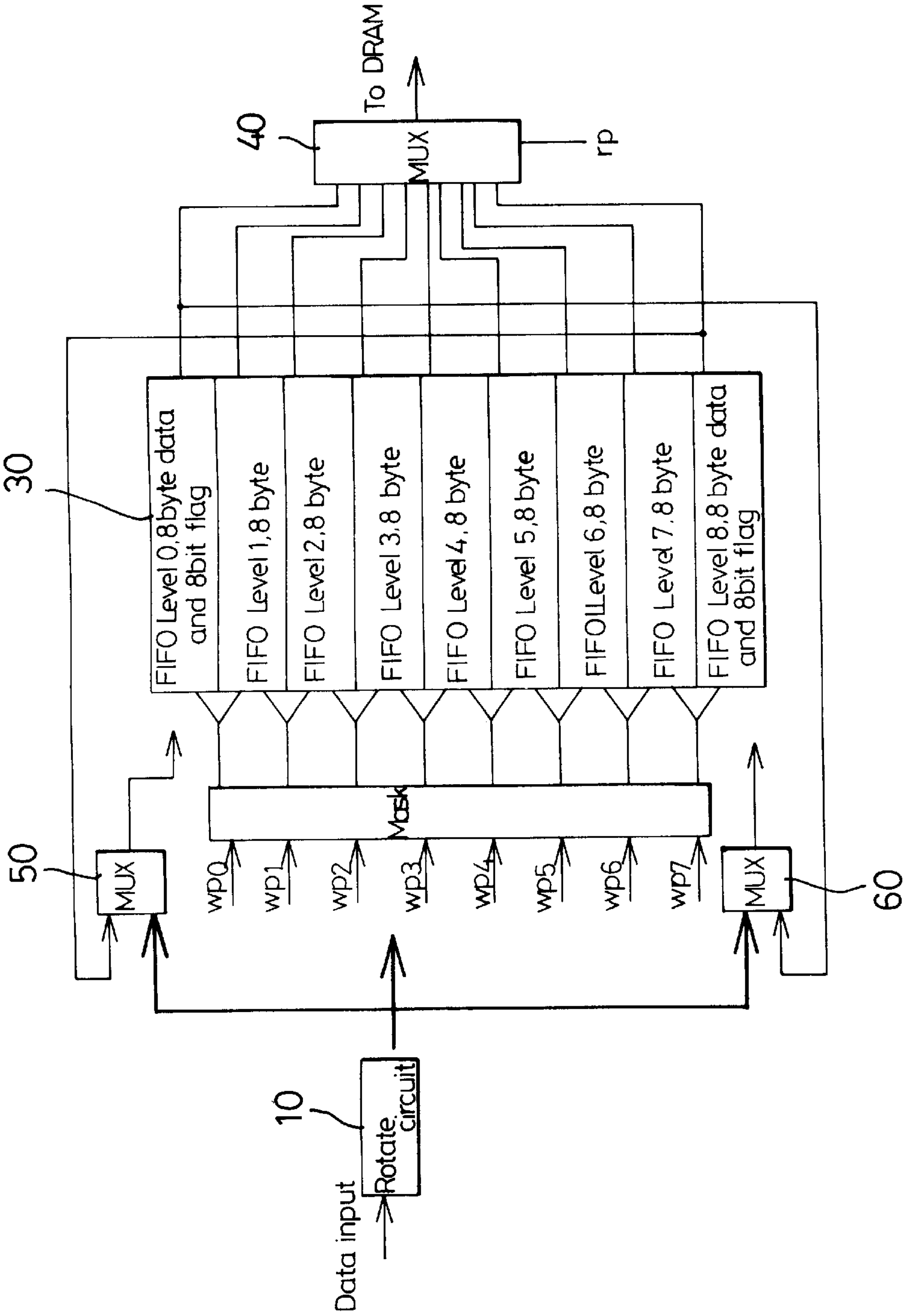
FIG. 4 is a block diagram showing the display queue structure of an embodiment of the present invention.

Referring to FIG. 4, the fast data alignment display queue structure for image block transfer of an embodiment in accordance with the present invention comprises a shift circuit 10 for shifting the input data to be shifted to a destination address, a bit mask 20, a multi-layer FIFO buffer 30 and multiplexers 40, 50, 60. The shift circuit 10 can also be constituted by multiplexers. The shift circuit 10 sets the number of bytes to be shifted rightward or leftward in respondence to a difference between a start address and a destination address of an image block to be shifted, and then executes data shifting for the image block. The shifted data can be written into portions of the adjacent two levels of the FIFO buffer 30 sequentially under the control of write-in pulses WP0–WP8 from the FIFO buffer 30. The bit mask 20, which can be constituted by logic circuits, is used to control each two adjacent levels of the FIFO buffer 30 to decide which bytes are writable and which bytes are non-writable. Therefore, only the specific bytes of each two levels of the FIFO buffer 30 are written with data. After each of the levels are sequentially filled with shifted data, the data can be read by an external DRAM through the multiplexer 40 in sequence. Since the data has been shifted by a certain number of bytes, the bytes of the first level (in this embodiment is level 0) and the last level (in this embodiment is level 8) are not all filled with data.

According to the present invention, in the case of rightward (downward) shifting, the data in the last level of the FIFO buffer 30, that is, level 8, which are not sufficient to be 64 bits, can be sent to the first level, that is, level 0, via the multiplexer 50 to be combined with the data sent into the level 0 thereafter to form a complete set (i.e. 64 bits) of data for subsequential proceeding. Similarly, in the case of leftward (upward) shifting, the data in level 0, which are not possible to constitute a complete set of 64 bits, can be sent to level 8 via the multiplexer 60 to be combined with the data sent afterward thereto to compose a complete set of 64 bits.

The operation steps of each portion of the block diagram in FIG. 4 will be described in detail as follows.

Figure 5:
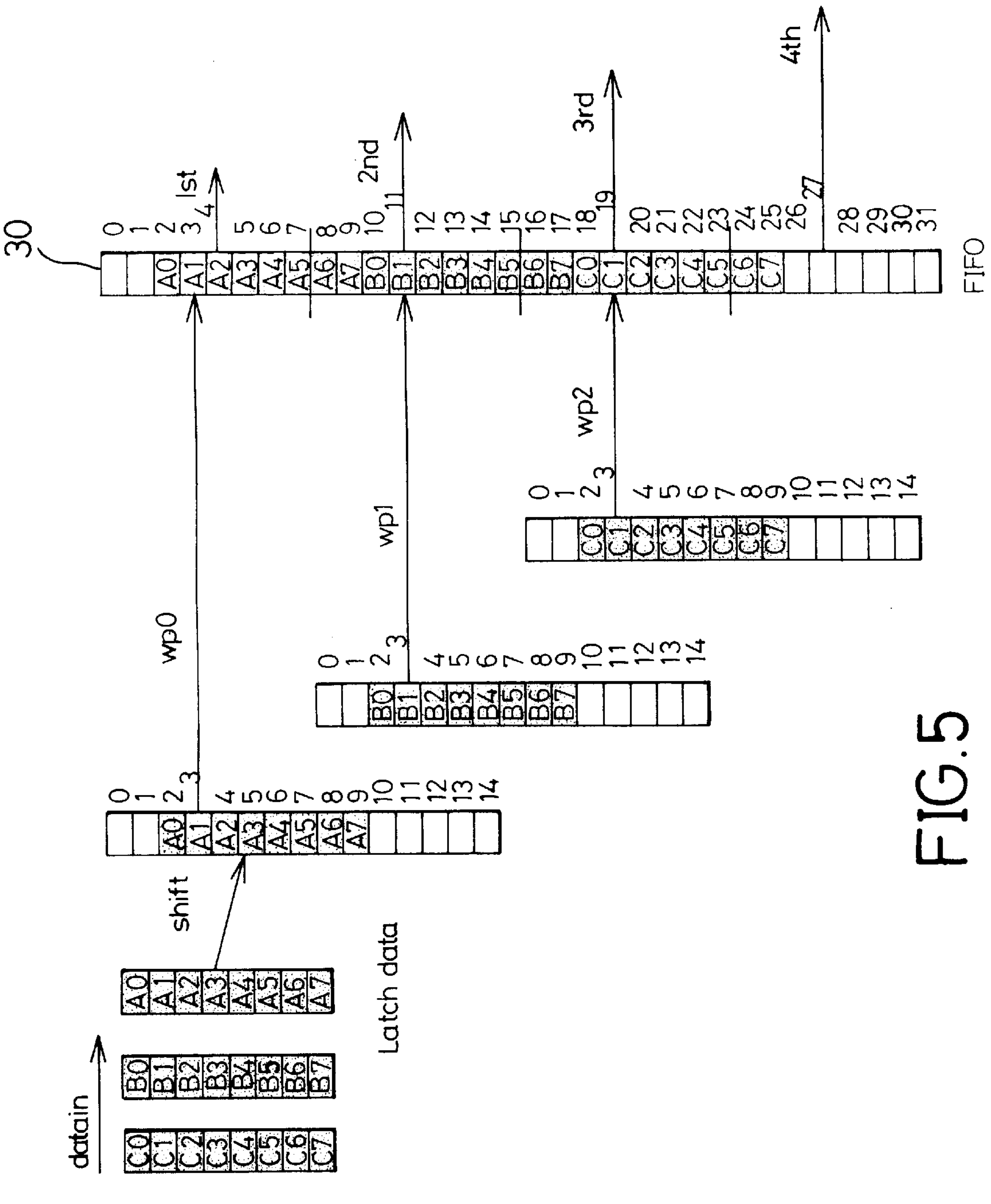
FIG. 5 is a diagram showing the operation for rightward shifting and writing the data into the FIFO buffer in accordance with the present invention.

Referring to FIG. 5, each grid indicating a space for a byte, and a number marked on the left side of each of the grids is the address thereof. Each of the shaded grids indicates that it contains valid data, while each of the blank grids indicates a grid which is masked by the bit mask 20. As the example shows in this figure, the original data is to be shifted rightward by two bytes (16 bits). Data A0–A7, B0–B7, and C0–C7, each of which is a set of data having 64 bits (8 bytes), are sequentially shifted rightward (downward) through the shift circuit 10 by two bytes, that is, each of the sets of data are shifted from address 0–7 to the addresses 2–9. The shifted sets of data are then written to the FIFO buffer 30 sequentially under the control of the write-in pulses WP0–WP2. The first level is from address 0 to 7, the second level is from address 8 to 15, the rest can deduced accordingly. As shown, each set of the shifted data is written to two adjacent levels of the FIFO buffer, for example, A0–A7 are written to address 2–7 of the first level and address 8 and 9 of the second level. Similarly, B0–B7 are written to address 10–15 of the second level and address 16 and 17 of the third level, and C0–C7 are written to address 18–23 of the third level and address 24 and 25 of the fourth level.

Figure 6:
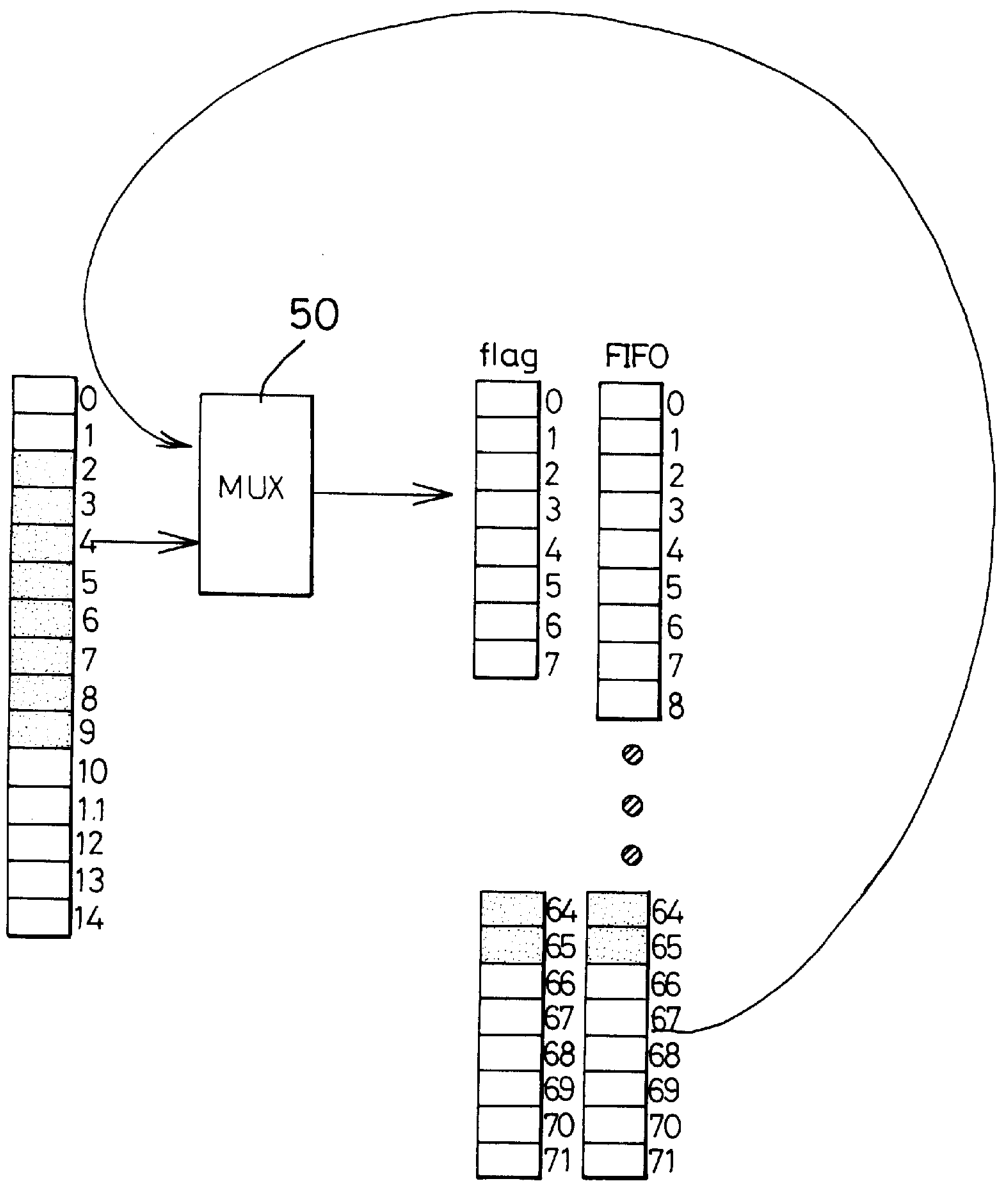
FIG. 6 is a diagram showing the data in the last level of the FIFO buffer is combined to the subsequentially input data through the multiplexer.

After each of the levels is filled with data, an external DRAM reads the data one level at a time. In the case of rightward (downward) shifting, the read operation is proceeded from the first level to the last level. Conversely, in the case of leftward (upward) shifting, the read operation is proceeded from the last level to the first level. In a situation where the data are shifted rightward by two bytes, the read operation should be proceeded beginning from the first level, however, as can be inferred from the example shown in FIG. 5, there are only two bytes of data filled in the first and second addresses of the last level (in which this embodiment is level 8), that is, the data in level 8 is not a complete set of 64 bits of data, therefore, the external DRAM will not read the data from level 8 at this moment. The two bytes of data in level 8 are transmitted to the multiplexer 50 to be registered, as shown in FIG. 6, to wait for subsequential data. After the subsequential data has been written in and sent to the multiplexer 50, the two bytes are then combined therewith to form a complete set of 64 bits of data. Therefore, the DRAM can read the set of data smoothly without losing any data. It should be noted that transmitting the data in level 8 to level 0 responds directly to the multiplexer 50 by direct connection to the input thereof, thus there is no need for any control procedure, in addition, such an operation is executed during an interval that memory reads or writes the data, and therefore there is no additional propagating time is occupied.

In addition, level 0 and level 8 each has 8 flags respectively corresponding to the 8 bytes thereof for indicating the validity for each of the bytes of each level. Therefore, when data is rightward (downward) shifted out of level 0, the read operation is executed passing over the level 0 and beginning with level 1 since there is no data stored therein; and when data is leftward (upward) shifted out of level 8, the read operation is executed passing over the level 8 and beginning with level 7 since there is no data stored therein. By this manner, the efficiency for reading data can be improved.

Figure 7:
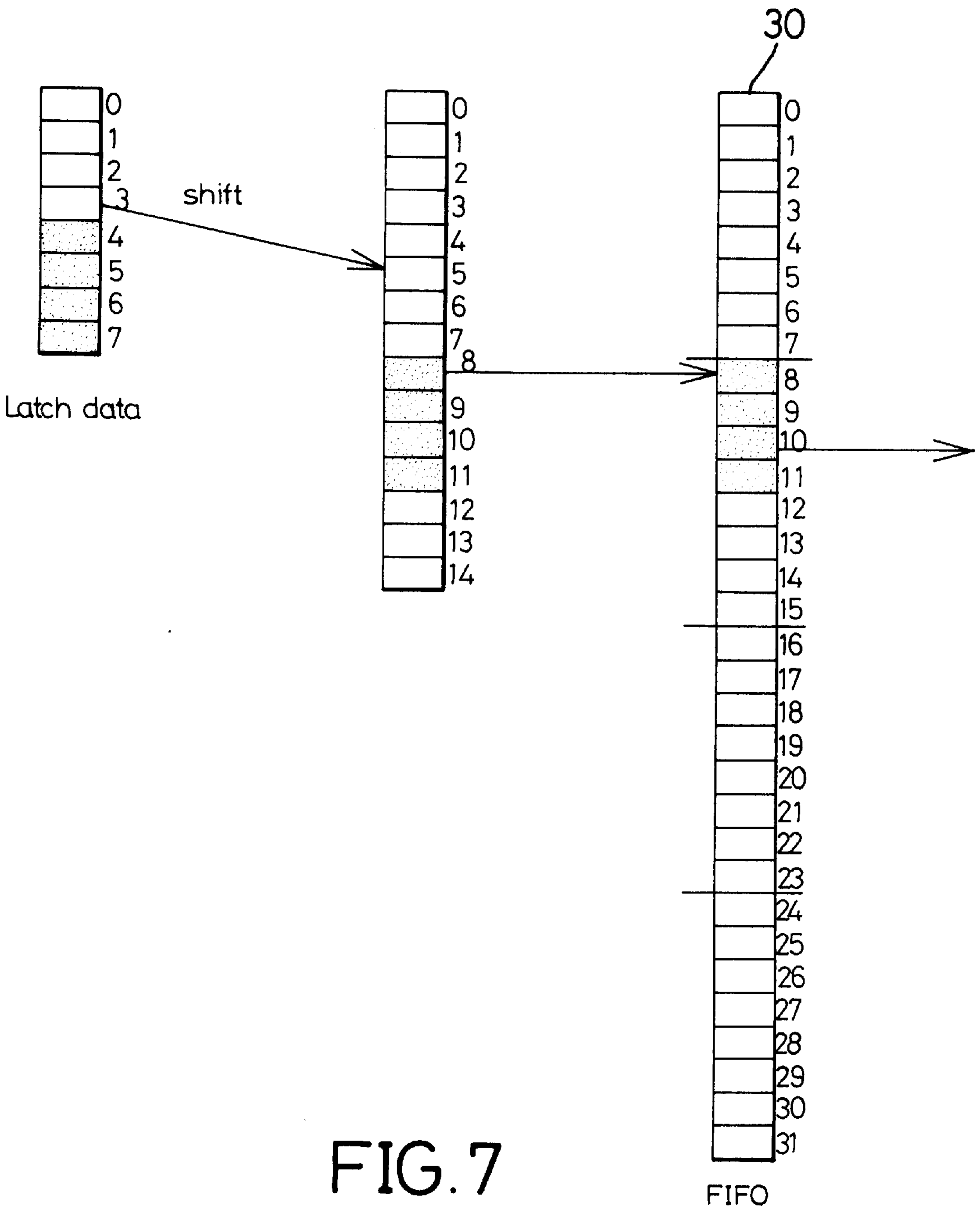
FIG. 7 shows the operations for writing and reading the data when the first level of the FIFO buffer is empty.

For example, referring to FIG. 7, an input data with start address 4 is to be rightward shifted by 4 bytes, that is, the start address is to be transferred from address 4 to address 8. The input data is rightward shifted by 4 bytes by the shift circuit 10, and then is written to the FIFO buffer 30 beginning from address 8, that is, from the level 1. Accordingly, as addresses 0–7 of level 0 are all blank, the external memory can recognize that the level 0 is blank by checking the flag thereof, and then pass over the level 0 to read the data of level 1. Indicating whether a level contains data with the flag thereof can be done by the existing control loop of the memory, therefore it does not result in an increase of cost.

Figure 8:
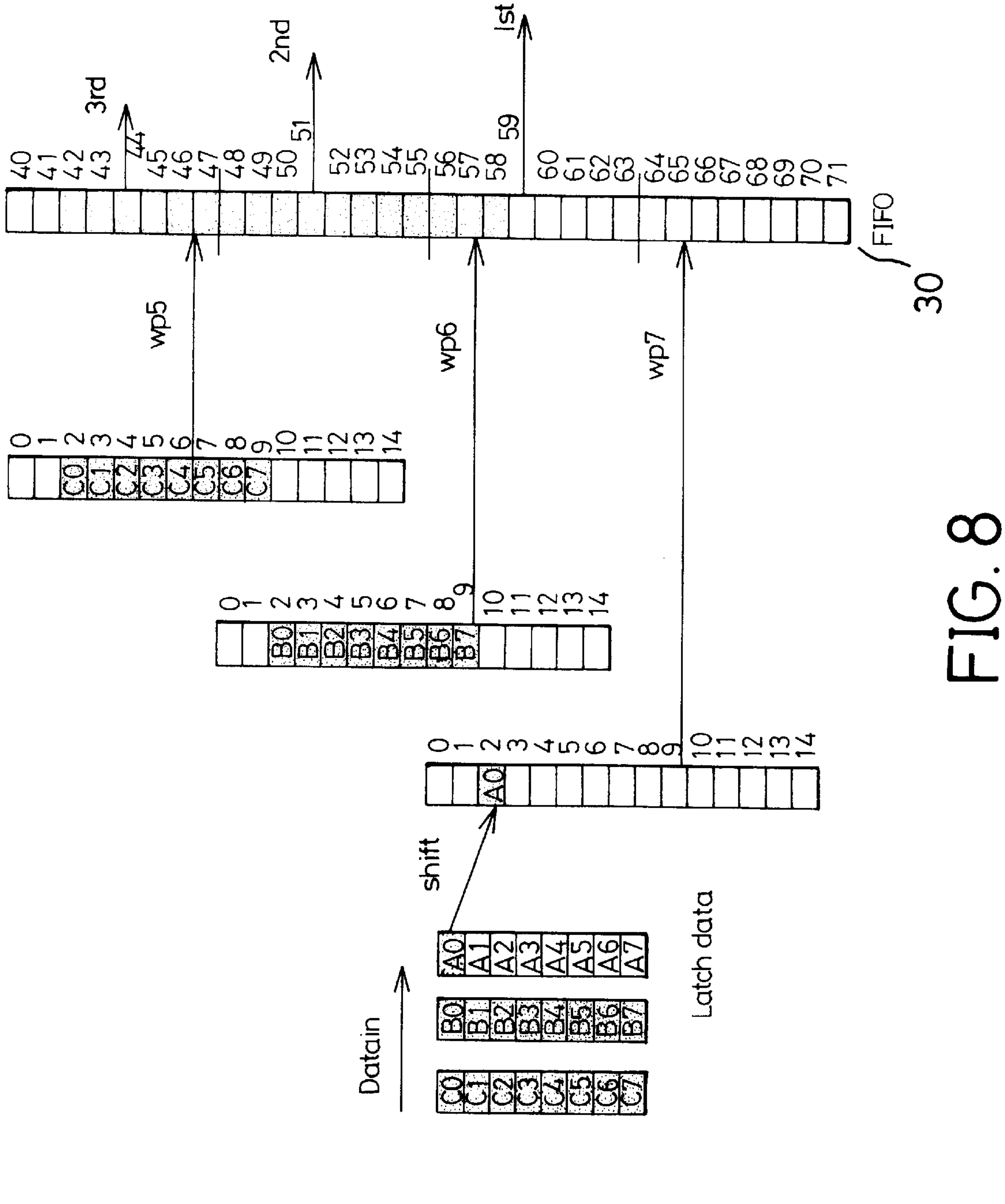
FIG. 8 is a diagram showing the operation for leftward shifting and writing the data into the FIFO buffer in accordance with the present invention.

The description above concerns the data rightward shifting. As to the leftward shifting, the operation steps are similar to those described above, except that the data is written to the FIFO buffer 30 in a sequence from the last level (level 8) to the first level (level 0), and the external memory reads the data also in the same sequence. An example is shown in FIG. 8, wherein the input data is shifted by two bytes and then written into the FIFO buffer 30 from the last level to the first level.

According to the structure of the present invention, there is no need for additional complex circuits, only the read-write control function needs to be added to the FIFO buffer 30. Namely, the present invention provides an economic manner to allow dual-directional data transfer.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fast data alignment display queue method for image block transfer, comprising steps of:

shifting sets of data which are sequentially input by a certain number of bytes, in which the number of bytes is decided according to a difference between a start address and a destination address of the data;

writing the shifted sets of data in first portions of each two adjacent levels of a multi-level FIFO buffer in a specific sequence depending on a direction toward which said shifted sets of data are shifted, and aligning the sets of data during the sequential writing;

reading the sets of data and writing the same to a memory according to the sequence that the sets of data are written in the FIFO buffer.

2. The fast data alignment display queue method for image block transfer according to claim 1, wherein the shifted sets of data are written to said FIFO buffer in a sequence from a first level to a last level for a rightward or downward transfer operation, and the memory reads the data from said FIFO buffer in the sequence from the first level to the last level.

3. The fast data alignment display queue method for image block transfer according to claim 2, wherein said memory reads the data from said FIFO buffer one level at a time.

4. The fast data alignment display queue method for image block transfer according to claim 1, wherein the shifted sets of data are written to said FIFO buffer in a sequence from a last level to a first level for a leftward or upward transfer operation, and the memory reads the data from said FIFO buffer in the sequence from the last level to the first level.

5. The fast data alignment display queue method for image block transfer according to claim 4, wherein said memory reads the data from said FIFO buffer one level at a time.

6. The fast data alignment display queue method for image block transfer according to claim 1, wherein the step of writing the shifted sets of data to the first portions of each two adjacent levels of said FIFO buffer is practiced by masking second portions of the two adjacent levels by a bit mask to leave said first portions to be written.

7. The fast data alignment display queue method for image block transfer according to claim 1, further comprising a step that data in the last level which can not be a complete set of data is transmitted to the first level to be combined with data which will be subsequentially input to the first level to form a complete set of data for a rightward or downward transfer operation.

8. The fast data alignment display queue method for image block transfer according to claim 1, further comprising a step that data in the first level which can not be a complete set of data is transmitted to the last level to be combined with data which will be subsequentially input to the last level to form a complete set of data for a leftward or upward transfer operation.

9. The fast data alignment display queue method for image block transfer according to claim 1, wherein the first and last levels of said FIFO buffer have flags for indicating validity for each byte of each level, respectively, the memory can skip the first or last level to read data in a next level if said flags indicate that said level is blank.

10. A fast data alignment display queue structure for image block transfer, comprising:

a shift circuit for setting a shifting amount according to a difference between a start address and destination address of a respective set of data and outputting shifted data;

a multi-level FIFO buffer for writing said shifted data in portions of each two adjacent levels of said FIFO buffer in a specific sequence depending on a direction toward which said sets of data are shifted, and aligning said shifted sets of data during the sequential writing;

a memory for reading data in each level of said FIFO buffer according to the writing sequence.

11. The fast data alignment display queue structure for image block transfer according to claim 10, wherein the shifted sets of data are written to said FIFO buffer in a sequence from a first level to a last level for a rightward or downward transfer operation.

12. The fast data alignment display queue structure for image block transfer according to claim 11, wherein the memory reads the data from said FIFO buffer in the sequence from the first level to the last level.

13. The fast data alignment display queue structure for image block transfer according to claim 12, wherein said memory reads the data from said FIFO buffer one level at a time.

14. The fast data alignment display queue structure for image block transfer according to claim 10, wherein the shifted sets of data are written to said FIFO buffer in a sequence from a last level to a first level for a leftward or upward transfer operation.

15. The fast data alignment display queue structure for image block transfer according to claim 14, wherein the memory reads the data from said FIFO buffer in the sequence from the last level to the first level.

16. The fast data alignment display queue structure for image block transfer according to claim 15, wherein said memory reads the data from said FIFO buffer one level at a time.

17. The fast data alignment display queue structure for image block transfer according to claim 10, further comprising:

a bit mask for masking addresses of second portions of each level of said FIFO buffer to leave said first portions to be written.

18. The fast data alignment display queue structure for image block transfer according to claim 10, wherein data in the last level which can not be a complete set of data is transmitted to the first level to be combined with data which will be subsequentially input to the first level to form a complete set of data for a rightward or downward transfer operation.

19. The fast data alignment display queue structure for image block transfer according to claim 10, wherein data in the first level which can not be a complete set of data is transmitted to the last level to be combined with data which will be subsequentially input to the last level to form a complete set of data for a leftward or upward transfer operation.

20. The fast data alignment display queue structure for image block transfer according to claim 10, wherein the first and last levels of said FIFO buffer have flags for indicating validity for each byte of each level respectively, the memory can skip the first or last level to read data in a next level if said flags indicate that said level is blank.

* * * * *